April 3, 1962     A. T. C. BURROWS     3,027,850
CONVEYOR SYSTEMS

Filed March 18, 1959     3 Sheets-Sheet 1

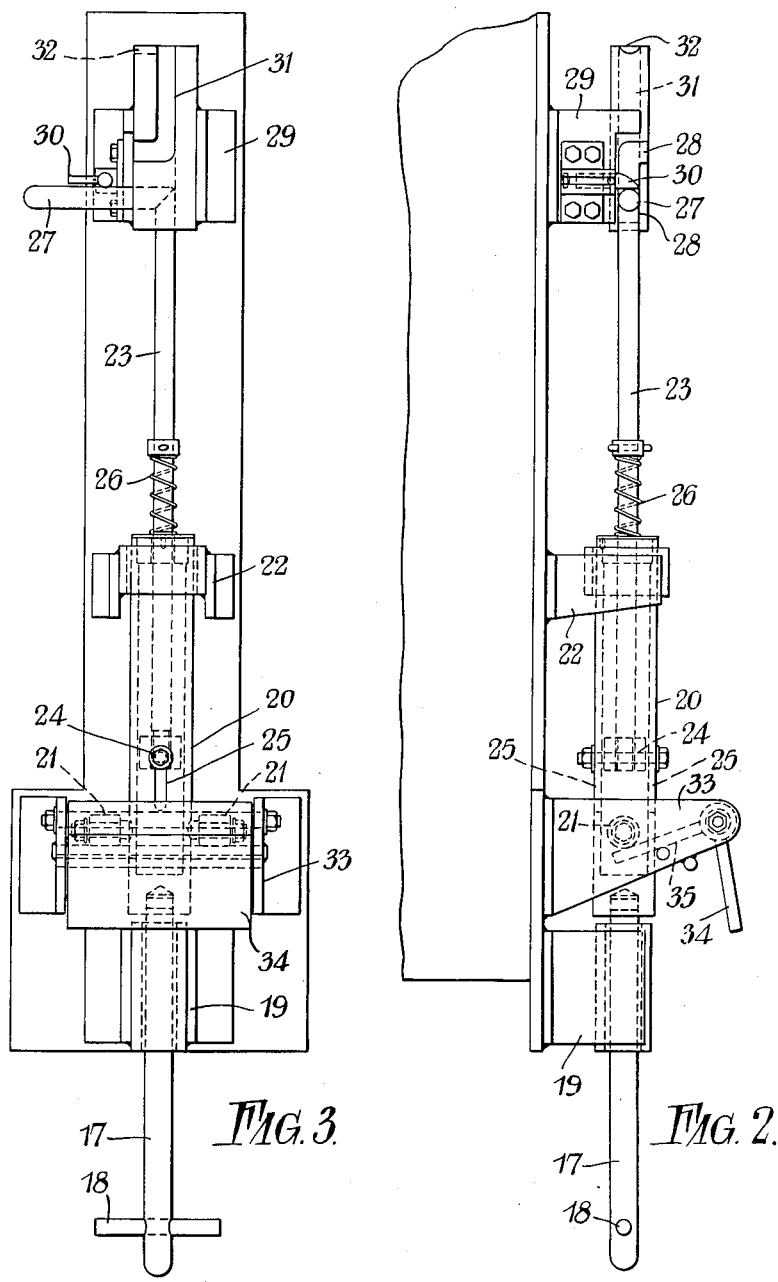

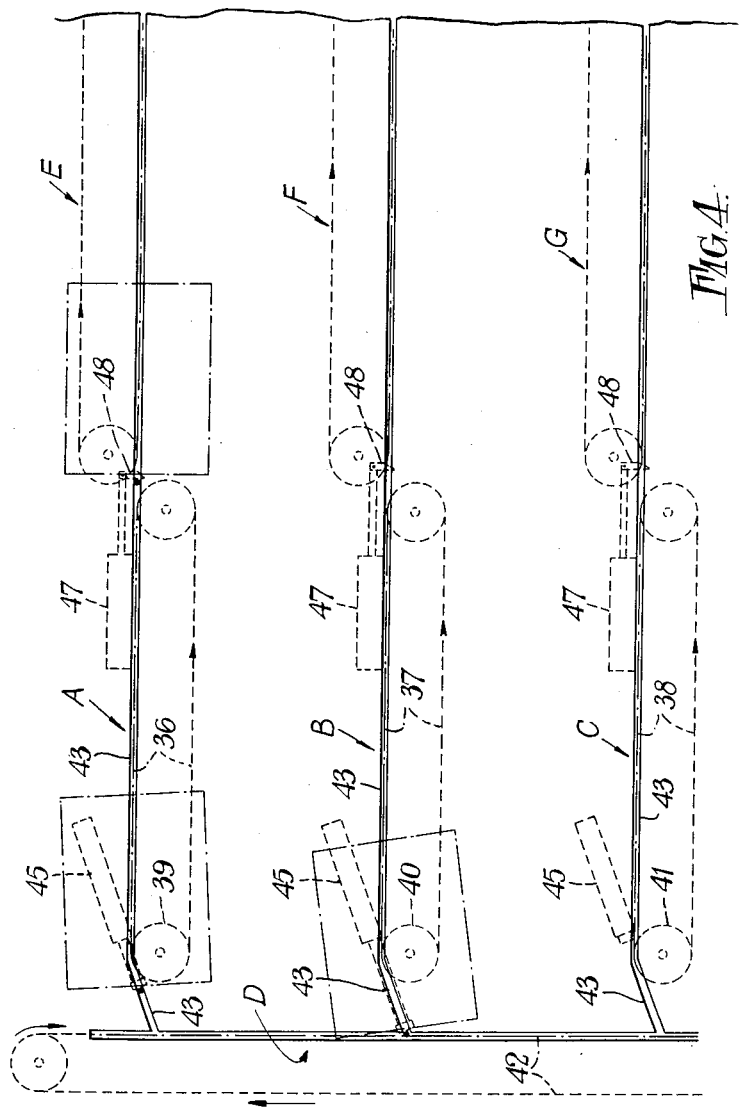

3,027,850
CONVEYOR SYSTEMS

Arthur Thomas Charles Burrows, Stevenage, England, assignor to Geo. W. King Limited, Stevenage, England, a British company
Filed Mar. 18, 1959, Ser. No. 800,215
Claims priority, application Great Britain Mar. 21, 1958
6 Claims. (Cl. 104—172)

This invention relates to conveyor systems and more particularly to so-called floor conveyors of the kind wherein load carrying vehicles or pallets are towed in a predetermined path over a floor or other surface by means of an endless driving chain which is caused to travel in a channel below such floor or surface there being depending bolt-like elements on the pallets adapted to cooperate with driving abutments on the chain.

According to the invention there is provided a conveyor system including at least two floor conveyors of the kind set forth which are relatively so arranged that the end of the operative or towing flight of the driving chain of one is disposed adjacent a point on the operative or towing flight of the driving chain of the second there being means whereby any load pallet may be transferred at will from driven or towed relationship with one of said chains and into driven or towed relationship with the other irrespective of whether the two chains are being driven at the same or at differing speeds.

Figure 1:
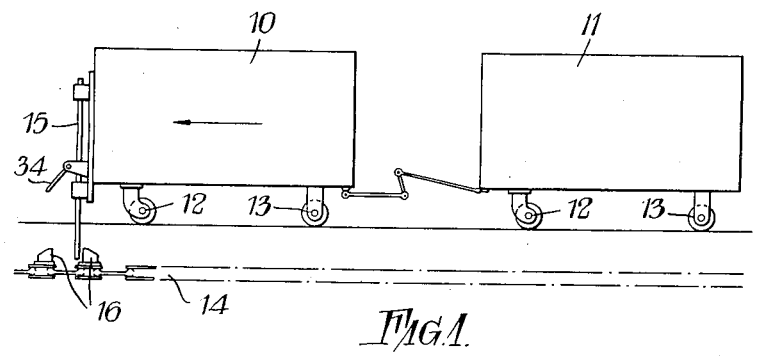
Figure 5:
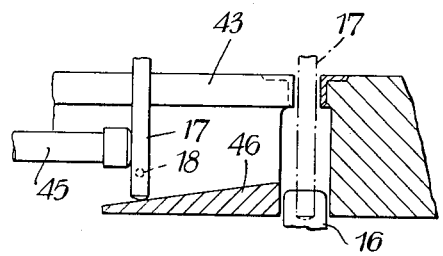
Figure 6:
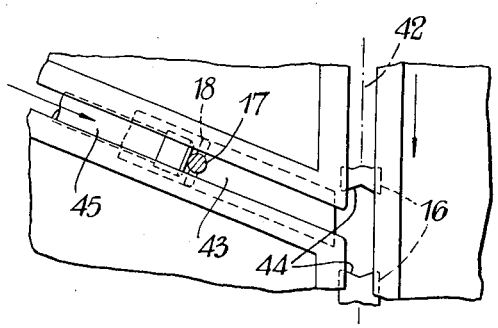

In order that the invention may be clearly understood and readily carried into effect the same will be hereinafter more fully described with reference to the accompanying drawings in which:

FIGURE 1 is a side elevational view showing two load carrying pallets coupled in tandem, the foremost pallet being operatively connected to a driving chain, FIGURES 2 and 3 are respectively side and front elevational views illustrating the construction of a slidable bolt element by means of which a driving connection is established between a pallet and the driving chain, FIGURE 4 is a plan view illustrating diagrammatically a part of a conveyor system, and FIGURES 5 and 6 are respectively part sectional and plan views illustrating diagrammatically certain details of construction.

Referring now to the drawings and more particularly to FIGURE 1, 10 and 11 denote two load carrying pallets which are coupled together, each pallett being provided at its fore part with a pair of swivelling wheels or castors 12 and at its rear part with a pair of wheels 13 rotatable about fixed axes. The pallets are designed to be supported on and to run over the surface of a floor or the like and they are adapted to be towed along a predetermined path over such floor by means of an endless driving chain 14 which is driven in any convenient known manner and is caused to travel along a channel below the floor surface. To establish a driving connection with the chain 14 the pallet 10 is provided at its forward end with a depending bolt like element or projection 15 which is adapted to be projected through a longitudinally extending slot in the top of the aforesaid channel and to cooperate with one of a plurality of sets of driving dogs or abutments, such as indicated at 16, such dogs or abutments being spaced along the length of the chain 14.

FIGURES 2 and 3 illustrate one constructional form of bolt like element and referring now to those figures it will be seen that the bolt like element therein illustrated comprises a lower rod like portion 17 carrying at its lower part a transverse bar 18 the purpose of which will be hereinafter made apparent. The rod like portion 17 which is supported for axial sliding movement in a bracket 19 affixed to the fore part of the pallet, is fixedly connected to a sleeve-like element 20 which carries a pair of laterally projecting rollers 21. The sleeve-like element 20 is slidably supported at its upper end in a bracket 22 also affixed to the fore part of the pallet. Projecting into the sleeve-like element 20 is an upper rod portion 23 which carries at its lower end a transverse bolt 24 adapted to engage in diametrically opposed slots 25 in said element 20. The sleeve-like element 20 and its associated rod like portion 17 are normally urged downwardly relatively to the upper rod like portion 23 by means of a spring 26 so that normally the bolt 24 will be located at the upper ends of the slots 25. It will be appreciated therefore that with the upper rod like portion 23 held against axial displacement the sleeve-like element 20 and its associated rod like portion 17 will be capable of upward movement relatively thereto against the action of the spring 26, the extent of such movement being limited by the length of the slots 25. The upper rod like portion 23 is provided at its upper end with a cranked or out-turned arm 27 adapted in the operative position of the bolt like element to be engaged in a slot 28 present in an upper bracket 29 affixed to the pallet. The arm 27 is normally held against displacement by means of a spring catch 30. Upon withdrawal of the catch 30 the arm 27 may be slid upwardly along the slot 28 and upon reaching the upper limit thereof it may be turned through 90° and thereafter moved upwardly along a slot 31 until it reaches the upper end whereafter it may again be turned back through 90° and located in a groove 32 at the upper part of the bracket 29. The above described manipulation of the arm 27 will result in the complete withdrawal of the rod like portion 17 from the channel in the floor. The first 90° movement of said arm 27 in its passage from slot 28 to slot 31 will result in a 90° movement of the complete bolt like element about its longitudinal axis so that the transverse bar 18, which normally extends transversely to the slot in the floor and is thus effective to prevent undesired withdrawal of the bolt from the channel, will be brought into alignment with said slot so that it may then pass through the latter. With the bolt completely withdrawn from the channel the load pallet to which it is attached may be moved freely over the floor in any direction and by virtue of the engagement of the arm 27 in the groove 32 said bolt will be effectively locked in its inoperative position. When it is required operatively to connect the pallet to the conveyor chain said pallet will be appropriately positioned over the channel in the floor and the arm 27 will be released from the groove 32 and turned into the slot 31. In this position the transverse bar 18 on the lower rod like portion 17 will be aligned with the slot in the top of the floor channel so that it will pass therethrough. As the arm 27 is turned into the slot 28 the bolt like element will be turned to bring said bar 18 transversely with respect to the slot so that said bolt like element will then be prevented from undesired displacement from the channel. With the arm 27 locked in its operative position as shown in FIGURES 2 and 3 the bolt like element will be operative. By virtue of the fact that the sleeve-like element 20 and its associated rod portion 17 are capable of upward movement relatively to the upper rod portion 23 against the action of the spring 26 the fact that the lower end of the bolt is not directly engaged with a driving dog or abutment on the chain 14 will make no difference since as a dog or abutment 16 approaches and contacts the lower end of the bolt the latter will ride up the sloping leading face of such dog or abutment (the upward displacement taking place against the spring 26) and will automatically drop into the engaged position under the action of said spring 26.

Pivotally mounted on a bracket 33 also carried by the pallet is a buffer plate 34 having rearwardly directed arms 35 adapted to cooperate with the rollers 21 cammed by the sleeve-like element 20. It will be appreciated that if there is any obstruction in the path of a pallet e.g. another pallet or a human being, the plate 34 will be depressed thereby causing the sleeve-like element 20 and its associated rod portion 17 to be raised against the action of the spring 26 so that the lower end of the rod like portion will be lifted clear of the driving dogs or abutments on the driving chain. The extent of such upward movement will be limited by the length of the slots 25 in which the transverse bolt on the upper rod like portion 23 slides, but as indicated above it will be sufficient to allow the rod like portion 17 to be lifted clear of the driving dogs or abutments so that no further drive will be imparted to the pallet until such time as the plate 34 is released and is allowed to move back to its initial position.

Referring now to FIGURE 4 this shows a possible layout of conveyors of the kind described above, there being shown three feeder conveyors A, B, and C which are arranged to feed load pallets on to a main conveyor line D. As described above the endless drive chains of the several conveyors are disposed in channels below floor level and the arrangement is such that the operative or driving flight of the chain of each of the feed conveyors A, B, C will end at a point closely adjacent to the operative or driving flight of the chain of the main conveyor D which is arranged to travel across the ends of said feed conveyors, all of the chains being in substantially the same horizontal plane. By the end of the driving or operative flight is meant the point at which that section of the chain effective to tow pallets, passes around a terminal sprocket wheel. In FIGURE 4, 36, 37 and 38 denote the chains of the feed conveyors while the respective terminal sprocket wheels are designated 39, 40 and 41. 42 denotes the driving chain of the main conveyor. The speeds of travel of the various chains are not necessarily synchronized although of course they could be so.

In the region of the end of the operative flight of each feed conveyor the slot 43 in the top of the chain channel through which slot the bolt-like elements on the pallets project, is continued preferably in a smoothly curved path so that it will lead or merge into the channel in which the operative flight of the chain 42 of the main conveyor is caused to travel, the arrangement being such that when a load pallet reaches the end of a feed conveyor the bolt-like element thereon may continue to move in said slot in the floor and eventually pass into the channel carrying said chain 42.

The driving dogs or abutments 16 on the driving chains of the conveyors, which dogs or abutments may be at the same or differing pitches depending upon the requirements in any particular case, are preferably made wider than the width of the slots in the tops of the respective channels so that a dog or abutment will be effective to engage a bolt like element on a pallet even when said bolt is displaced to a certain extent from the center line of the chain as will be seen during the initial and concluding stages of a transfer operation. As indicated above each dog or abutment will in known manner be so constructed as to incorporate a central pocket or recess adapted to accommodate the lower end portion of a pallet bolt element and chamfered or inclined leading and trailing faces adapted to act as cam surfaces so that if, for example, the lower end of a bolt element is brought into contact with the leading face of a dog or abutment it will be caused to ride smoothly upwardly until it reaches the pocket or recess whereupon it will then drop downwardly into the engaged position. If desired the front and rear walls defining the pocket or recess may be of curved or substantially V-shape as shown at 44 (FIGURE 6) to assist in centering the bolt in relation to the pocket or recess and hence in relation to the chain.

Located adjacent the end of each feed conveyor is a ram or thruster device 45 which is disposed below the level of the floor but at a level intermediate the top of the channel and the dogs or abutments on the driving chain, said ram or thruster device being so constructed and arranged that it will be adapted on operation to engage the lower rod like portion 17 of the depending bolt-like element on any pallet present at the end of the feed conveyor and positively to push such pallet, by virtue of its engagement with the bolt-like element, into a position wherein it is appropriately disposed with respect to the main conveyor, with its bolt like element in the channel of the latter and engageable by a driving dog or abutment on the chain of said main conveyor. Conveniently the respective rams or thruster devices will be electrically operated although of course they might well be operated either pneumatically or hydraulically or even manually if so required. Preferably the arrangement will be such that each ram or thruster device will remain in its extended or operative position after each actuation until such time as the bolt of the transferred pallet is engaged by a dog or abutment on the driving chain of the main conveyor so that it will constitute a stop and will prevent any tendency to undesired rearward movement of the pallet during the period of transfer.

In order to prevent the possibility that the bolt of any pallet which is being transferred may foul or become jammed against the side of a driving dog or abutment on the chain of the main conveyor as such bolt enters the chain channel of the latter there is provided in the region of the junction of the channels a fixed ramp or cam surface indicated at 46 (FIGURE 5) which will be effective, as a bolt-like element moves along the slot 43 connecting the channels of the feed and main conveyors, to lift said element so that as it enters the channel of the main conveyor the lower end portion 17 thereof will be raised above the level of the driving dogs or abutments on the main conveyor chain. Once the lower end of the bolt-like element is over the path of travel of the dogs or abutments said element may be allowed to drop back to its initial position since if it does not then fall into the pocket or recess of a dog or abutment it will contact either the chamfered or inclined leading or trailing end face thereof. If the bolt contacts the leading end of a dog or abutment it will be displaced smoothly upwardly until it reaches the recess or pocket whereupon it will drop into the engaged position. If however the bolt contacts the trailing end of a dog or abutment it will merely ride off the latter and will be in a position to be engaged by the next approaching dog or abutment.

In FIGURE 4 the thruster devices 45 in respect of the three feed conveyors are shown in three differing positions, the device associated with conveyor A being shown at an initial stage of its operative stroke wherein it has engaged the bolt like element of a pallet which has just left the feed conveyor. The device in respect of conveyor B is shown at the full extent of its operative stroke whereat it forms a stop to prevent any undesired return movement of the pallet while the device in respect of conveyor C is shown in its inoperative position.

It will be appreciated that if desired it will be feasible by an appropriate rearrangement of the operative parts to reverse the operation above described and to transfer load pallets from the aforesaid main conveyor to any of the feed conveyors, i.e. from a point intermediate the ends of the operative flight of one chain to the feed end of another chain.

Although in the FIGURE 4 a layout is shown incorporating three feed conveyors it will be apparent that it will be feasible appropriately to arrange any desired number of such feed conveyors in relation to one or more other conveyors extending across or transversely with respect thereto so that transfer of load carrying pallets from any of such feed conveyors to said other or one of said other transverse conveyors may be effected at will.

It will also be appreciated that it will readily be possible to arrange that the thruster devices in respect of the several feed conveyors will operate in a predetermined order or sequence thereby to insure that load trolleys are transferred from the several feed conveyors to the transverse conveyor or conveyors in a preselected order and/or in preselected numbers or batches.

In the embodiment shown in FIGURE 4 the load pallets are fed to the feed conveyors, A, B and C by further feeder conveyors E, F, G respectively. The operative or drive flights of the further feeder conveyors, E, F, G are substantially aligned with the operative or drive flights of the respective feed conveyors A, B and C and at the junction of each pair of conveyors a ram or like device 47 is provided in order to effect a positive transfer of pallets from one conveyor to the other. At the outer end of the movable element of each such ram or like device there is provided a pivoted spring loaded arm or finger 48 which is adapted to be pushed forwardly by the bolt like element of any pallet as it approaches the end of one of said further conveyors E, F or G. The arrangement is such that once a bolt-like element has passed the appropriate arm or finger 48 the latter will snap back into its initial position wherein it will be effective on retractive movement of the movable element of the ram or like device to engage the bolt-like element and to propel the pallet forwardly into a positon such that said bolt like element will be engaged by a driving dog or abutment on the drive chain of the appropriate feed conveyor A, B or C.

It will be appreciated that pallets may be held on each of the feed conveyors A, B, C pending transfer to the main conveyor D merely by providing an appropriate stop which is movable into a position to contact the buffer plate 34 at the fore part of the leading pallet on any such feed conveyor. Stoppage of a pallet by means of such a stop will result in automatic stoppage of any following pallets since as each such following pallet approaches one that is already stopped the buffer plate thereon will contact the stationary pallet thereby causing retraction of the bolt-like element and discontinuance of the drive.

The aforesaid stop means may be actuated electrically, pneumatically, hydraulically or even manually to control the feed of pallets to the transfer point and in the case where, as indicated above, there is a plurality of feed conveyors leading to one or more transversely extending conveyors it may be desirable electrically or otherwise to interconnect the stop means associated with the respective feed conveyors so that when one or more pallets is or are being transferred from one selected feed conveyor the stop means on the other feed conveyors will be effective to prevent forward movement of pallets to their respective transfer points. Furthermore it will be possible readily to arrange for the stop means of the several feed conveyors to be actuated in a predetermined sequence.

What is claimed is:

1. A conveyor system comprising load carrying means, separate driving means defining paths of travel for the load carrying means, one of said paths terminating at a distance from the other of said paths, one of said driving means engaging said load carrying means and driving the latter along said one path towards said other path, thruster means operatively disposed with respect to said one driving means to engage said load carrying means at the termination of said one path and to move the load carrying means through said distance to said other path for engagement by the other driving means, support means supporting said load carrying means and provided with slots corresponding with said paths, said load carrying means and driving means being on opposite sides of said support means, said load carrying means comprising a projection adapted to extend through said slots for engagement by said driving means and said thruster means, said projection being supported for displacement in a direction substantially normal to the support means with said load carrying means supported by the support means, said thruster means including a piston and cylinder device operative to engage said projection and move the same through said distance, and a ramp between said paths engaging the projection for elevating the same above the driving means upon approach of said projection to a slot for entry into said other path to facilitate engagement of the projection by the driving means in said latter path.

2. A system as claimed in claim 1 wherein said driving means include endless members and dogs on said members, said dogs having sloped leading and trailing faces to facilitate engagement and disengagement of said projection.

3. A system as claimed in claim 2 wherein said load carrying means includes a resilient device engaging said projection whereby the latter can resiliently engage said faces.

4. A system as claimed in claim 1 comprising a transverse member on said projection constituting a key means to lock the projection with respect to said support means and means coupled to said projection to rotate the same for the engagement and disengagement.

5. A system as claimed in claim 4 wherein said projection comprises two slidably engaged sections, one of which is provided with a slot and the other of which includes means engaging in said slot whereby the sections are slidably engaged but fixed against rotation, and a spring urging said sections apart within a limit established by said slot.

6. A system as claimed in claim 5 comprising a handle on one of the sections for removing said projection from engagement with said support means and a bracket on said load carrying means, said bracket being provided with a slot of predetermined form for accommodating and guiding said handle, said bracket constituting the means to rotate said projection.

References Cited in the file of this patent
UNITED STATES PATENTS

| | | |
|---|---|---|
| 404,656 | Ramsay | June 4, 1889 |
| 1,000,107 | Morris | Aug. 8, 1911 |
| 1,407,253 | Castleman | Feb. 21, 1922 |
| 1,420,115 | Lange | June 20, 1922 |
| 1,610,366 | Fox et al. | Dec. 14, 1926 |
| 2,101,353 | Waalkes | Dec. 7, 1937 |
| 2,619,370 | Leger | Nov. 25, 1952 |
| 2,660,127 | Boyko et al. | Nov. 24, 1953 |
| 2,803,198 | McCaul et al. | Aug. 23, 1957 |
| 2,816,516 | Diehl | Dec. 17, 1957 |
| 2,871,799 | King | Feb. 3, 1959 |
| 2,875,704 | Yates | Mar. 3, 1959 |
| 2,878,758 | D'Altrui | Mar. 24, 1959 |
| 2,885,969 | Kay et al. | May 12, 1959 |
| 2,936,718 | Bradt et al. | May 17, 1960 |